United States Patent [19]

Clavin

[11] 4,092,928
[45] June 6, 1978

[54] TRAVELING SUPPORT APPARATUS

[75] Inventor: Edward A. Clavin, Houston, Tex.

[73] Assignee: Midcon Pipeline Equipment Co., Houston, Tex.

[21] Appl. No.: 759,781

[22] Filed: Jan. 17, 1977

[51] Int. Cl.² .................... B61B 13/04; E01B 25/08
[52] U.S. Cl. .................... 104/119; 104/165;
104/246; 104/247; 105/144; 305/33; 305/47
[58] Field of Search ................ 104/93, 106, 107, 110,
104/118, 119, 147 R, 165, 242, 245, 246, 247;
105/141, 144, 148, 150, 30; 228/25, 29, 32;
219/60 A, 125 R; 305/33, 39, 47

[56] References Cited

U.S. PATENT DOCUMENTS

| 348,416 | 8/1886 | Rich | 104/147 R |
|---|---|---|---|
| 1,395,559 | 11/1921 | Davis | 104/245 X |
| 1,419,510 | 6/1922 | Norelius | 305/47 |
| 3,229,883 | 1/1966 | Yost | 219/125 R X |
| 3,753,525 | 8/1973 | Homes | 228/29 |
| 3,844,468 | 10/1974 | Nelson et al. | 228/29 X |

Primary Examiner—Randolph A. Reese
Attorney, Agent, or Firm—Carl B. Fox, Jr.

[57] ABSTRACT

Traveling support apparatus for supporting welding device or other apparatus for peripheral travel about a pipe. The support apparatus utilizes endless belts disposed around paired wheels at opposite sides of the apparatus to propel the apparatus along a track. The endless belts are pivotally supported for equal pressure engagements with the path along which the support apparatus travels. The support apparatus engages opposite sides of a track in the form of a strip or band spacedly surrounding a pipe to support a frame which is held firmly against movements toward or away from the track so that the supported apparatus is reliably held in position with relation to the pipe.

9 Claims, 8 Drawing Figures

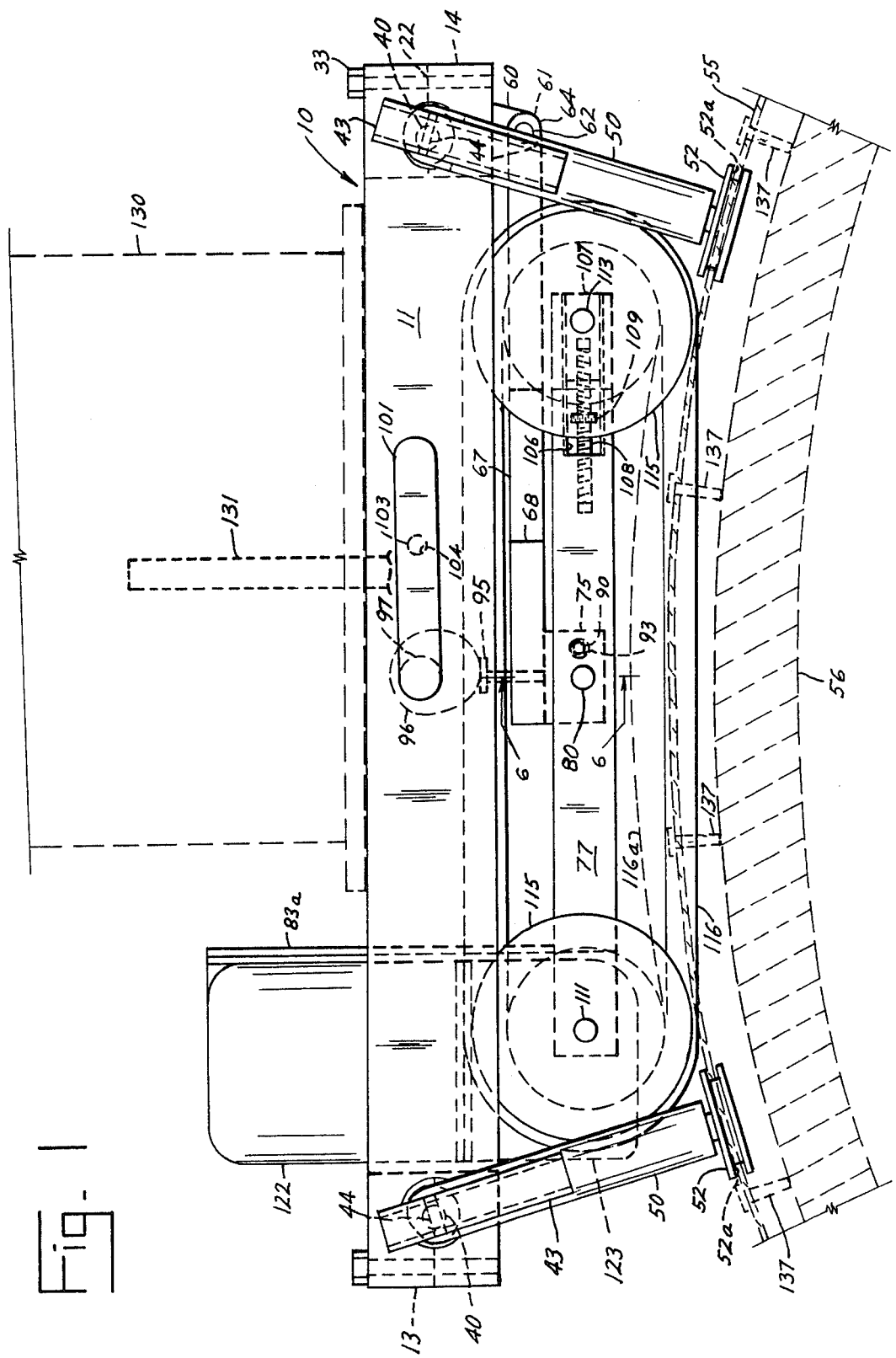

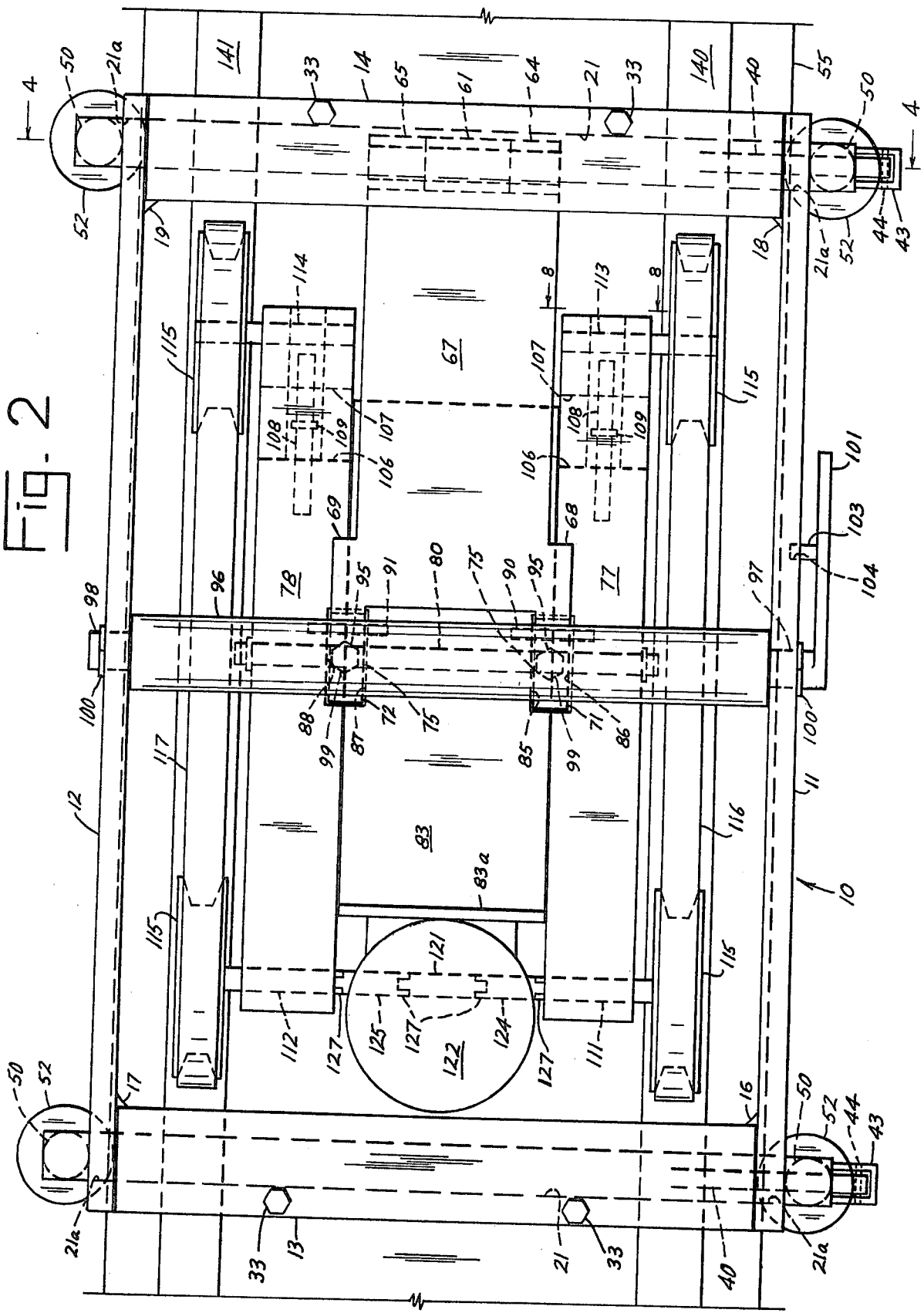

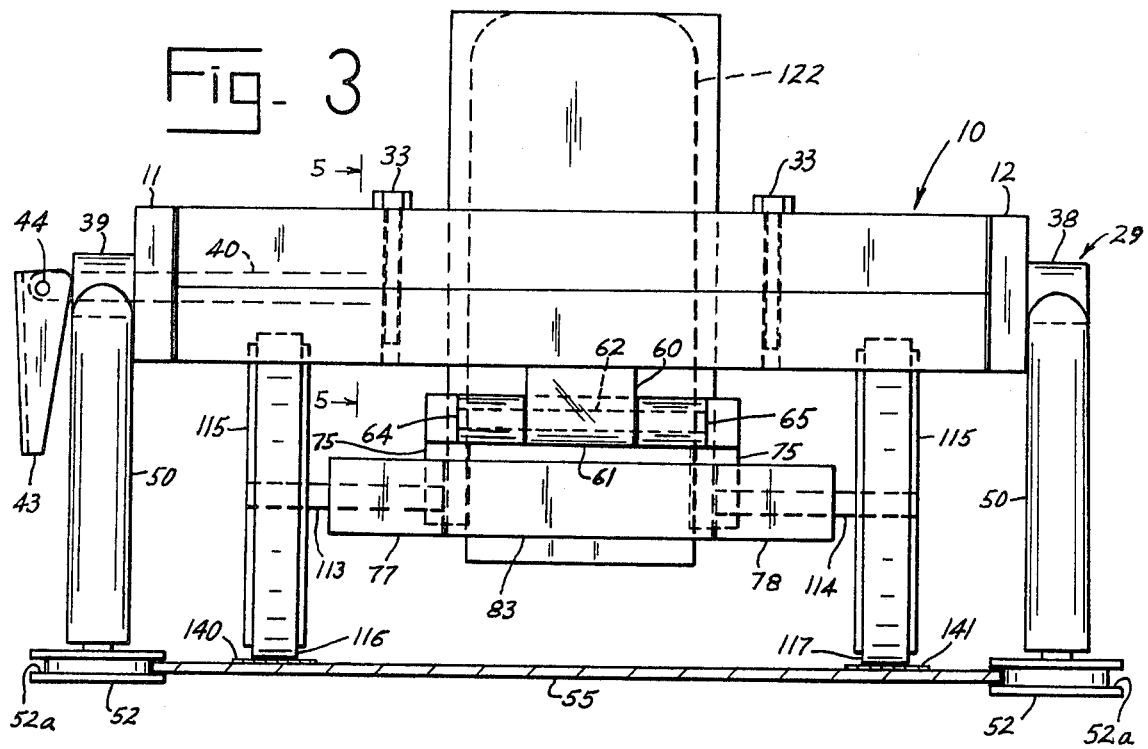
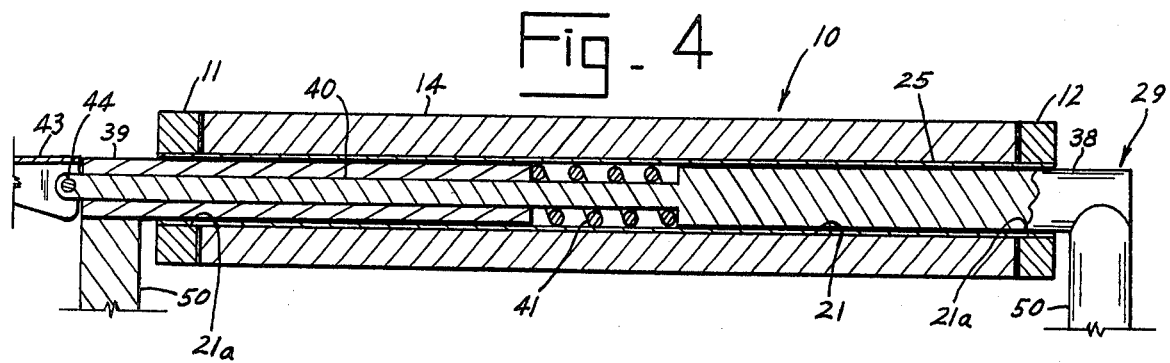
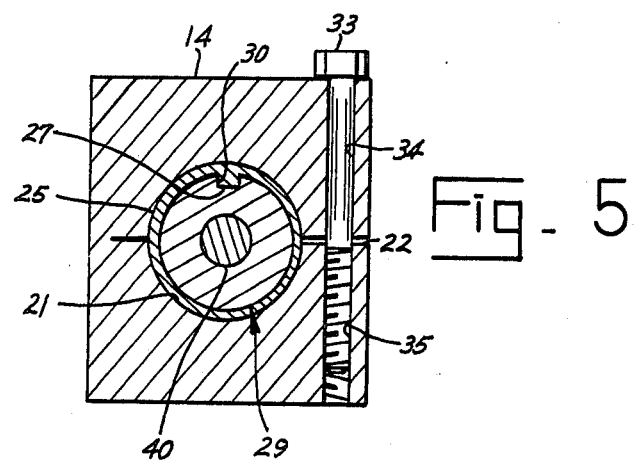

TRAVELING SUPPORT APPARATUS

BACKGROUND OF THE INVENTION

A number of carriers or supports adapted for movement about the outer periphery of a pipe have been supplied in the art for carrying welding devices and like apparatuses around the pipe, particularly for use in making welds between pipe sections disposed in end-to-end abutment. Such devices have invariably been subject to unwanted movements in their travel about the pipe so that the weld quality and uniformity is adversely affected. This invention provides an apparatus adapted to travel about a pipe without peripheral slippage and with constant spacing from the outer surface of the pipe so that unwanted movements adversely affecting weld quality and appearance do not occur.

SUMMARY OF THE INVENTION

According to the invention, a traveling support or carrier apparatus is provided for use in making peripheral welds around pipes and for use in supporting other devices for performing work in circular fashion about the periphery of a pipe. The traveling support apparatus is particularly useful for supporting a welding device for making welds about the ends of abutted pipes. The support or carrier apparatus is engaged with a track in the form of a band or strip, usually of metal, secured spacedly about the pipe. The apparatus has opposed wheels which engage the opposite outwardly facing edges of the band or strip. The band engaging wheels are idler wheels, and the device is driven by endless belt drives engaging the outer surface of the truck, whereby slippage of the device lengthwise of the track is fully prevented.

Apparatuses have been provided wherein the apparatus is driven about the pipe by drive rotation of the wheels engaging the sides of the band or strip, but this arrangement is subject to slippage of the drive wheel or wheels with respect to the band or strip whereby weld irregularity occurs. The present invention avoids such difficulties.

The wheels carrying the endless belts are pivotally mounted whereby equal pressure engagement of the belts occurs from end-to-end and at opposite sides of the carrier device. The carrier device accurately follows the band or strip supported about the pipe whereby the welding device or other apparatus carried by the carrier device accurately and reliably follows the outer pipe contour.

A principal object of the invention is to provide a traveling support apparatus for supporting a welding device or other apparatus for movement of the welding device or other apparatus about the outer periphery of a pipe. Another object of the invention is to provide such apparatus which is driven about the pipe by endless belt drives disposed against a track in the form of a band or strip fixed spacedly about the outer periphery of the pipe. A further object of the invention is to provide such apparatus wherein the endless belt drives engage a frictional surface provided around the track. Yet another object of the invention is to provide such apparatus which is securely fixed radially with respect to the track and pipe. Yet another object of the invention is to provide such apparatus which is entirely dependable and reliable in operation and yet which is economical.

Other objects and advantages of the invention will appear from the following detailed description of preferred embodiments thereof, reference being made to the accompanying drawings.

BRIEF DESCRIPTIONS OF THE DRAWINGS

FIG. 1 is a side elevation of a preferred embodiment of apparatus according to the invention.

FIG. 2 is a plan view of the apparatus shown in FIG. 1.

FIG. 3 is an end elevation of the apparatus shown in FIGS. 1 and 2.

FIG. 4 is a partial vertical cross section taken at line 4—4 of FIG. 2.

FIG. 5 is a partial vertical cross section taken at line 5—5 of FIG. 3.

DESCRIPTION OF THE PREFERRED EMBODIMENTS

Figure 6:
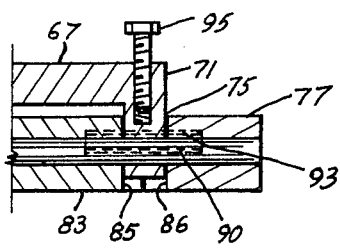
FIG. 6 is a partial vertical cross section taken at line 6—6 of FIG. 1.
Figure 8:
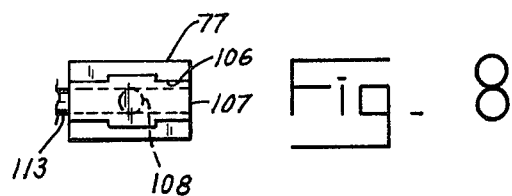
FIG. 8 is a partial elevation taken at line 8—8 of FIG. 2.

Referring now to the drawings in detail, a support frame 10 includes opposite side elements 11, 12 and opposite end elements 13, 14. End elements 13, 14 are welded to elements 11, 12 at 16–19, shown in FIG. 2.

Each element 13, 14 is in the form of a bar having a longitudinal cylindrical passage 21 therethrough. Each bar 13, 14 is split at 22 almost across its full horizontal width, the splits intersecting the passages 21 as best shown in FIG. 5. A relatively thin walled cylindrical sleeve 25 is disposed through each passage 21, each sleeve 25 extending also through cylindrical holes through the opposite ends of each element 11, 12. Elements 11, 12 are in the form of bars welded at 16–19 to the elements 13, 14. Each element 11, 12 is provided with cylindrical openings 21a each forming a terminal extension of the passages 21.

Referring especially to FIG. 5, each sleeve 25 has an inwardly projecting spline 27 which extends over at least part of the length of each sleeve 25. A shaft 29 is longitudinally slidably disposed through each sleeve 25, each shaft 29 having a longitudinal groove 30 disposed along at least part of its length and adapted to receive the spline 27 of the sleeve 25. The purpose of the splines 27 and grooves 30 is to prevent relative rotations between each shaft 29 and sleeve 25. Screws 33 are disposed slidably movably through cylindrical openings 34 of each element 13, 14 and are threadedly engaged through tapped cylindrical openings 35 of each element 13, 14. Tightening of screws 33 causes compressive force against the outside of each sleeve 25 whereby the sleeve is fixed against rotation in opening 21. Loosening of screws 33 loosens the sleeve in opening 21 whereby the sleeve may be rotated. Fixing in place of each sleeve 25 also fixes each shaft 29 in place against rotation. The angularity of each shaft 29 may be adjusted by loosening the screws 33 and rotating the sleeve 25 to the desired position, after which the screws 33 are again tightened. Spline 27 and groove 30 are not shown in FIG. 4.

Each shaft 29 is made up of a cylindrical bar element 38 and a tubular element 39. Each element 38 has an extended reduced portion 40 around which the tubular portion 39 is closely yet longitudinally slidably received. A compression spring 41 is disposed end-to-end between elements 38 and 39. A cam latch 43 is pivotally connected to the end of each shaft portion 40 by a pin 44. Each cam latch 43 has an end and side form as shown in FIGS. 3 and 4 which provides that shaft elements 38, 39 are moved toward one another to compress spring 41 when the cam latch is moved to the position shown in FIG. 3, and which provides that the elements 38, 39 may move longitudinally farther apart relieving the compression of spring 41 when the cam latch is moved to its position as shown in FIG. 4.

A cylindrical leg 50 is affixed by welding transversely to each end of each shaft 29, a leg 50 being affixed to the end of each shaft portion 38 and to the end of each shaft portion 39 as shown. In FIG. 3, the legs 50 are shown moved against the sides of elements 11, 12 and in FIG. 4 the legs 50 are shown moved somewhat away from the sides of elements 11, 12. The shaft movements are provided by appropriate moements of the cam latches 43 in the manner described.

Figure 7:
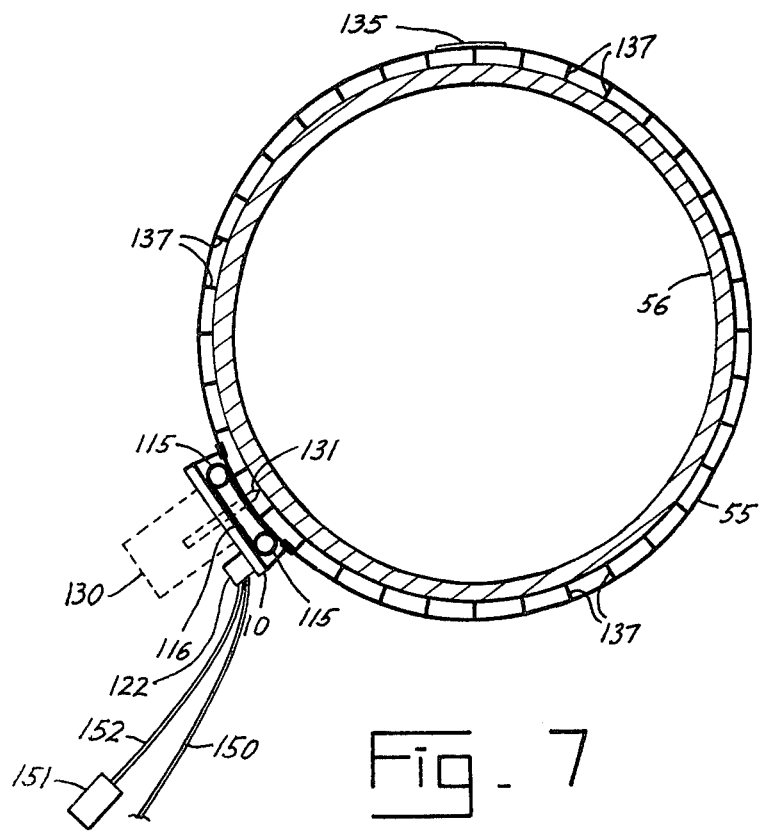
FIG. 7 is a schematic vertical cross section illustrating the manner of use of the apparatus.

The peripherially slotted wheels 52 which are rotatively carried at the ends of legs 50 may be engaged with and disengaged from the opposite edges of a track formed by a strip 55 spacedly disposed about a pipe 56 (see also FIG. 7). The peripheral slots 52a of the wheels 52 are slightly wider than the thickness of the strip 55 in order that the edges of the strip 55 may be received therein when the strip 55 is in bent condition around a pipe. The wheels 52 engaged with the strip edges securely hold the support frame 10 against movements radially of strip 55, whereby the frame 10 is securely fixed in position with regard to strip 55 yet may be rolled therealong. The wheels may be placed on or removed from the opposite edges of strip 55 with cam latch 43 in its position shown in FIG. 4, which allows legs 50 to move outwardly from frame 10. The cam latch 43 is moved to its position as shown in FIG. 3 to secure the wheels 52 snugly to the edges of strip 55.

A bracket 60 having tubular portion 61 is affixed at the underside of member 14. A pin 62 is disposed through tubular portion 61 of bracket 60 and tubular portions 64, 65 provided at one end of pivotal bar support element 67 are engaged around the opposite ends of pin 62. Element 67 is thus pivotal toward and away from frame 10. At its opposite end, element 67 is widened at opposite shoulders 68, 69 and the side portions 71, 72 extend as a yoke formation. Each portion 71, 72 has a downwardly extending lug 75. A pair of rocker elements 77, 78 are pivotally mounted on a shaft 80 disposed through cylindrical holes through lugs 75 and through cylindrical holes through elements 77, 78. A central rocker element 83 has a cylindrical hole therethrough through which pin 80 is also disposed. Elements 77, 78, 83 have side recesses 85-88 into which lugs 75 extend. Elements 77, 78 and 83 are rotatable to a limited extent about shaft 80. The amount of pivotal rotation of these elements is controlled by pins 90, 91 fixed through holes through lugs 75 and freely received into openings or slots 93 of the elements 77, 78 and 83.

A screw 95 is adjustably screwed into a tapped opening at the upper side of each yoke element 71, 72. A cam bar 96 having reduced cylindrical ends, 97, 98 disposed through cylindrical holes through elements 11, 12 and rotatably secured by snap rings 100 is rotatable by movement of lever 101 to forceably engage the heads of screws 95. By adjustment of the degree to which the screws 95 are threaded into the holes in yoke elements 71, 72, the amount of force provided against the opposite sides of bar support element 67 by cam 96 may be adjusted. Lever 101 has a pin 103 engageable in a cylindrical recess 104 in the side of element 11 by which the cam position may be fixed in place after the cam has been forced against the heads of screws 95. Lever 101 is bendable in order to achieve the positioning of pin 103 into the cylindrical recess 104.

Each pivotal bar member 77, 78 has an end recess 106 in which a keyed block 107 is slidably disposed. A dowel screw 108 oppositely threaded at each end is screwed into tapped openings of the members 77, 78 and the blocks 107. By rotation of central hubs 109 of the dowel screws, the positions of the blocks 107 in the slots 106 may be adjusted. This permits adjustments of the tensions of the belts 116, 117, to be described.

Axles 111, 112 and 113, 114 are disposed through the lefthand ends of elements 77, 78 and through the blocks 107 at the opposite ends of the elements 77, 78, respectively. Each of these axles carries a wheel 115 in the form of a belt sheave. Endless elastomeric belts 116 and 117 are disposed around the pairs of wheels 115 at each side of the apparatus. A central drive shaft 121 is reversably driven in rotation by electric motor 122 through gear box 123. Electric motor 122 and gear box 123 are supported by upstanding portion 83a of element 83. Link drive shafts 124, 125 connect drive shaft 121 to wheel shafts or axles 111, 112 through universal joint shaft connections 127. In this manner, wheels 115 carried by axles 111, 112 may be driven in rotation in either direction notwithstanding the limited pivotal movements of elements 77, 78 and 83.

The dowel screws 108 provide for adjustments of the tensions of belts 116, 117 disposed around the wheels 115. The belts 116, 117 are further tightened by the arcuate forms 116a assumed by the belts when the apparatus is disposed against the peripherally curved track or strip 55. Pressure of the wheel assembly against the strip 55 is adjustable by adjustment of the screws 95, previously described. Since the wheels 115 are enabled to bear against strip 55 with substantially equal force because of pivoting of elements 77, 78 about shaft 80, the belts 116, 117 have uniform and equal traction against the strip 55. It will be realized, further, that the legs 50 and wheels 52 are placed in tension between frame 10 and strip 55 by the forcing of belts 116, 117 against strip 55 and by the tensioning of belts 116, 117, which serves to further stabilize the position of frame 10 with respect to strip 55. In other words, the frame 10 cannot move radially of the pipe 56. Therefore, frame 10 is highly stable as to position.

Frame 10 may support a welding device 130 (FIGS. 1 and 7) having a welding tip 131 positioned for welding a peripheral seam between abutted pipe ends. For this purpose, the strip 55 is positioned adjacent the position of the weld. Strip 55 has at least one end connection 135 whereby the strip may be disposed about the pipe other than from an end of the pipe. The strip 55 may also be removed from its position around the pipe without the necessity for access to an end of the pipe. The strip 55 is supported spaced uniformly from the outer pipe surface by plural support lugs 137 affixed thereto at spaced intervals around the length of the strip. The structure of such strips is well known in the art and need not be further described and illustrated.

It will be understood that apparatus 130 may be a welding device, or a cutting torch, or any other apparatus needed for performing work around the outer periphery of a pipe or other cylindrical structure.

Referring particularly to FIGS. 2 and 3 of the drawings, the strip or track 55 may be provided with means for increasing traction between the belts 116, 117 and the strip 55. For example, frictional strips 140, 141 may be secured along the length of the strip 55 coincident with the travel paths of the belts 116, 117. Alternatively, the strip 55 surface may be appropriately roughened or otherwise treated to increase traction between belts 116, 117 and strip 55. Belts 116, 117, instead of being elastomeric, may be metal link belts having teeth or lugs engaged with teeth or lugs provided around strip 55.

The drive belts 116, 117 are very firmly engaged with the outer surface of strip 55 so that there is virtually no possibility of slippage of the belts especially when a frictional surface is provided on strip 55 or when lug or tooth engagements between the belts and strip 55 are provided. For this reason, there is no hesitation or irregularity travel of the traveling support apparatus around the pipe which would cause detriment or unsightliness of a weld formed by a welding device carried by the traveling support. Also, since strip 55 is at a fixed distance from the pipe determined by the lengths of lugs 137, and since support frame 10 cannot vary in its distance from strip 55, the spacing from the pipe of a welding gun carried by the support apparatus will not vary during travel of the support apparatus around the pipe. Welds made using the apparatus will therefore be uniform and of good quality. Other work done using the apparatus will likewise be of uniform improved quality.

Referring to FIG. 7 of the drawings, while only one traveling support apparatus is shown disposed on track 55, plural traveling support apparatus may be disposed on the track and used at the same time. In welding abutted pipe ends together, it is customary especially in the case of large pipe to form the weld at different portions of the pipe periphery in a predetermined sequence. For example, the upper left and lower right quadrants of the pipe periphery may be welded simultaneously after which the lower left and upper right quandrants are welded simultaneously. Or, the quadrants may be welded, upper right first, lower left second, lower right third, and upper left fourth. A number of such welding sequences have been devised and used, their purpose being to minimize effects of unequal heating of the pipe periphery. The welds may be made in both directions around the pipe, and simultaneous welds may be made with welder travel in the same or opposite directions.

The apparatus herein disclosed will usually be energized through an electric conductor cable 150 leading from a suitable electrical power source to electric motor 122. A controller 151 connected to motor 122 by electrical conductor cable 152, or alternatively, connected in cable 150, may be used to control speed and direction of travel of the traveling support apparatus along track 55. Such motor controllers and their operation are well known in the art, and any available type which is suitable may be used.

The apparatus may be used on tracks other than tracks supported circularly around pipes, and may be used in nonsupportive applications. The apparatus may travel along either straight or curved tracks, and may travel along tracks bent transverse of their planes or parallel to their planes. The apparatus may travel along spaced tracks at each side of the apparatus, and may travel along tracks having openings bridged by the endless belts. The apparatus will travel steadily in spite of minor interruptions in the track, such as over track joints and even over sufficiently smooth lapped joinders. The flexibility of movement of the belts with regard to the wheels 52 will enable the belts to travel across surface irregularities without interruption of smooth travel of wheels 52 and frame 10.

Drive motor 122 may be a fluid motor, such as a hydraulic motor or gas motor, instead of an electric motor.

While preferred embodiments of the apparatus have been described and shown in the drawings, many modifications thereof may be made by a person skilled in the art without departing from the spirit of the invention, and it is intended to protect by Letters Patent all forms of the invention falling within the scope of the following claims.

I claim:

1. Traveling apparatus, comprising body means having oppositely disposed pairs of wheel means adapted to engage oppositely outwardly facing uniformly spaced edges of track means, and endless belt drive means supported by said body means adapted to engage said track means to propel said traveling apparatus along said track means, each of said oppositely disposed pairs of wheel means being supported by a cross shaft assembly having telescoped shaft elements biased to elongate by spring means disposed therebetween and including control means operable to compress said spring means to shorten said shaft assembly to move said wheel means against said opposite edges of said track means, said control means also being operable to relieve said compression of said spring means whereby said shaft assembly is lengthened to space said wheel means from said opposite edges of said track means.

2. The combination of claim 1, said endless belt drive means comprising a pair of endless belts disposed adjacent opposite sides of said body means each supported around a pair of belt sheaves rotatably carried at opposite ends of a separate rocker member, said rocker members being pivotally mounted on opposite ends of a cross shaft, said cross shaft being supported by a pivotal bar means having said cross shaft connected thereto adjacent one end thereof and having its other end pivotably connected adjacent an end of said body means, whereby pivotal movements of said bar means adjusts the spacing of said cross shaft from said track and whereby pivotal movements of said rocker members equalizes end to end pressures of each of said endless belts against said track means.

3. The combination of claim 2, including means limiting the pivotal movements of said rocker members about said cross shaft, and means limiting the pivotal movement of said bar means at said pivotal connection adjacent an end of said body means.

4. The combination of claim 2, said belt sheaves at one end of each said rocker member being interconnected by a drive shaft connected by universal joints at its opposite ends to the axles of said belt sheaves, means carried by said body means for driving said drive shaft in rotation to rotate said belt sheaves, said universal joints permitting said pivotal motion of said rocker means during rotation of said belt sheaves.

5. The combination of claim 1, each said cross shaft assembly including a pair of parallel support arms depending transversely of said assembly one at each side of said body means, said wheel means comprising a wheel affixed for rotation at the outer end of each said support arm.

6. The combination of claim 5, each said cross shaft assembly being rotatable about its axis to adapt said wheels to curvature of said track means transverse to its face.

7. Traveling apparatus, comprising body means having wheel means rotatively supported thereby adapted to engage oppositely outwardly facing uniformly spaced edges of track means, and endless belt drive means supported by said body means adapted to engage said track means to propel said traveling apparatus along said track means, said endless belt drive means comprising a pair of endless belts disposed adjacent opposite sides of said body means each supported around a pair of belt sheaves rotatably carried at opposite ends of a separate rocker member, said rocker members being pivotally mounted on opposite ends of a cross shaft, said cross shaft being supported by a pivotal bar means having said cross shaft connected thereto adjacent one end thereof and having its other end pivotally connected adjacent an end of said body means, whereby pivotal movements of said bar means adjusts the spacing of said cross shaft from said track and whereby pivotal movements of said rocker members equalizes end to end pressures of each of said endless belts against said track means.

8. The combination of claim 7, including means limiting the pivotal movements of said rocker members about said cross shaft, and means limiting the pivotal movement of said bar means at said pivotal connection adjacent an end of said body means.

9. The combination of claim 7, said belt sheaves at one end of each said rocker member being interconnected by a drive shaft connected by universal joints at its opposite ends to the axles of said belt sheaves, means carried by said body means for driving said drive shaft in rotation to rotate said belt sheaves, said universal joints permitting said pivotal motion of said rocker means during rotation of said belt sheaves.

* * * * *